June 16, 1925.
R. B. McGOWAN
GROUND VASE
Filed Nov. 19, 1923
1,541,983
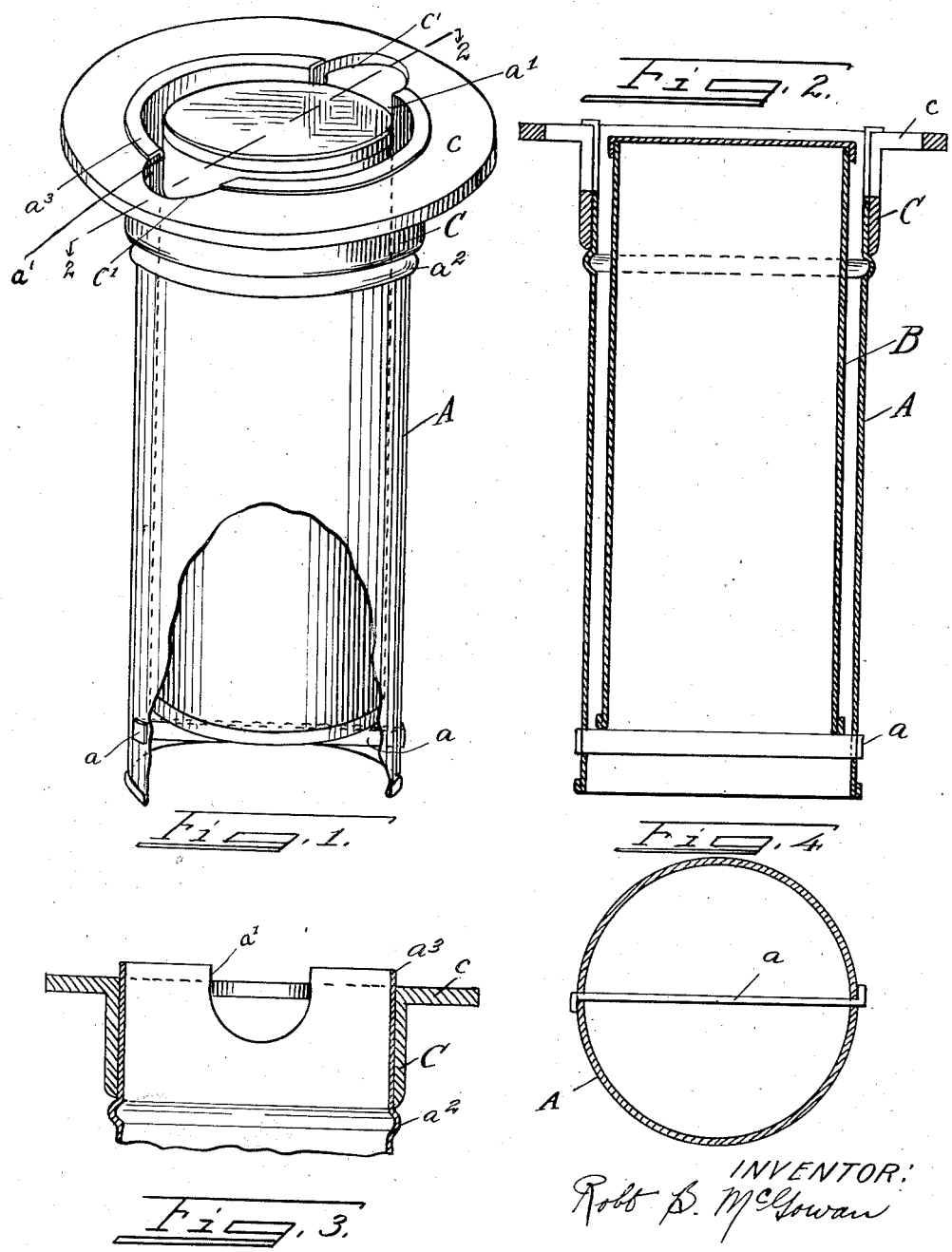
INVENTOR:
Robt B. McGowan
BY
Walter A. Knight
ATTORNEY.

Patented June 16, 1925.

1,541,983

UNITED STATES PATENT OFFICE.

ROBERT B. McGOWAN, OF CINCINNATI, OHIO.

GROUND VASE.

Application filed November 19, 1923. Serial No. 675,605.

*To all whom it may concern:*

Be it known that I, ROBERT B. MCGOWAN, a citizen of the United States, residing at Cincinnati, in the county of Hamilton and State of Ohio, have invented new and useful Improvements in Ground Vases, of which the following is a specification.

My invention relates to ground vases adapted for use in cemeteries, nurseries or gardens.

The object of my invention is to provide an efficient ground vase combination comprising an outer shell member and an inner flower holder member, the inner member being readily removable from within the outer member and the outer member of such construction as to prevent the vase from sinking into the ground.

Another object of my invention is to provide a ground vase comprising an outer casing member and an inner vase member of such construction as to prevent soil and clay from getting between the two members.

In cemeteries, gardens, or the like where a lawn mower is frequently used my invention will be found particularly useful, as it is adapted to set into the earth so that the top rim is level with the surface of the ground so as to form permanent clearance for lawn mowers.

My invention is illustrated in the accompanying drawings in which:

Fig. 1 is a perspective of my complete device, showing part of the outer shell member broken away, Fig. 2 is a vertical section on the line 2—2 of Fig. 1, showing the inner flower member in inverted position, Fig. 3 is a vertical cross section through the outer member showing the ring member in position thereon prior to being secured thereto, the lower part of the outer member broken away, and Fig. 4 is a horizontal cross section thru the outer shell member showing the preferred method of securing the supporting strip.

An outer casing member A preferably cylindrical in shape and made out of a single piece of sheet metal suitably shaped so as to leave both ends open, is adapted to form a supporting casing for the cylindrical flower vase B.

A ring member C provided with a flange $c$ is preferably a casting and is placed over the outer member A, so as to be supported by the beading $a^2$ (see Fig. 3) due allowance being made so that the upper edge $a^3$ of the casing A may be spun over flange $c$, as shown in Fig. 1, to prevent the displacement of the ring member C. Recesses $c^1$ $c^1$ are formed in the ring member C so as to enable the ready removal of the vase member B.

A metal strip $a$ is rigidly secured to and across the inside of the casing A, toward the base thereof, so as to form a support for the flower vase member B; the case is generally only slightly smaller in diameter than the casing and the casing A is cut away at $a^1$ $a^1$ to correspond to the recesses $c^1$ $c^1$, to enable the inner flower vase to be readily removed from the casing.

The inner flower vase member B is of such height as to be substantially level with the top surface of the outer casing A when both casing and vase are in position for use in the ground.

The vase B is made water tight and when not in use can be inverted so as to prevent the accumulation of water therein and thereby avoid freezing of the parts.

It will be readily seen that my device can be made of any of a number of materials and of various shapes and I do not wish to be limited to the exact construction as shown but claim as my invention all forms readable on the claims.

I claim as my invention and desire to secure by Letters Patent of the United States:

1. A ground vase having in combination a tubular casing through which water may drain and pass into the ground in which the casing is sunk when in use, a stiffening collar secured to the top of said casing, said collar having an outwardly extending supporting flange at the top adapted to rest on the surface of the ground when the casing is in position for use, a flower vase adapted to telescope inside said casing, said vase member adapted to terminate at the top substantially on a level with the top of said casing, means secured to a lower part of said casing for supporting said vase member, and finger recesses in said casing and collar to facilitate the withdrawal of said vase member.

2. A ground vase having in combination a cylindrical casing open at both ends, a support secured to and across the inside of said casing near the bottom thereof, a concentric flower vase adapted to rest on said support within the casing when in upright or inverted position, the upper rim of said vase being substantially level with the upper rim of said casing, when resting on said support, said casing cut away at its upper edge so as to form finger recesses to enable the ready removal of the flower vase from the casing.

3. In a ground vase the combination of a cylindrical casing provided with finger recesses, an outwardly extending bead on said casing, a metal casting comprising a flanged ring member, supported by said bead, a vase member within said casing and means integral with said casting for permitting the ready removal of said vase from said casing.

In testimony whereof I have hereunto set my hand.

ROBERT B. McGOWAN.